(12) United States Patent
Huang

(10) Patent No.: US 8,037,580 B2
(45) Date of Patent: Oct. 18, 2011

(54) TENSIONING APPARATUS FOR STRAP

(76) Inventor: Han-Ching Huang, Taichung (TW)

( * ) Notice: Subject to any disclaimer, the term of this patent is extended or adjusted under 35 U.S.C. 154(b) by 431 days.

(21) Appl. No.: 12/355,819

(22) Filed: Jan. 19, 2009

(65) Prior Publication Data

US 2010/0180412 A1      Jul. 22, 2010

(51) Int. Cl.
*B25B 25/00*  (2006.01)
*B60P 7/06*   (2006.01)
*B60D 1/06*   (2006.01)

(52) U.S. Cl. ............... 24/68 CD; 254/217; 410/100

(58) Field of Classification Search .......... 24/68 CD, 24/909; 254/217, 218, 222, 223, 237, 238, 254/239; 242/388.2, 388.6; 410/100, 103, 410/12

See application file for complete search history.

(56) References Cited

U.S. PATENT DOCUMENTS

| 6,102,371 | A *  | 8/2000  | Wyers ........................ 254/218 |
| 6,609,275 | B1 * | 8/2003  | Lin ............................ 24/68 CD |
| 7,100,902 | B1 * | 9/2006  | Lu .............................. 254/218 |
| 7,296,326 | B2 * | 11/2007 | Madachy et al. ........... 24/68 CD |
| 7,861,382 | B1 * | 1/2011  | Madachy et al. ........... 24/68 CD |
| 2007/0056146 | A1 * | 3/2007 | Madachy et al. ........... 24/68 CD |
| 2010/0247265 | A1 * | 9/2010 | Jensen ......................... 410/100 |

* cited by examiner

Primary Examiner — Robert Sandy

(57) ABSTRACT

A tensioning apparatus is adapted to tension a strap. The tensioning apparatus includes a frame and a shaft rotatably installed on the frame. The strap is inserted through the shaft and includes first and second portions extending in opposite directions. A handle is pivotally connected to the frame and is operable to rotate the shaft and wind the strap on the shaft thereafter. The tensioning apparatus also include a reeling device and the second portion of the strap is adapted to be received and wound onto the reeling device.

10 Claims, 13 Drawing Sheets

TENSIONING APPARATUS FOR STRAP

BACKGROUND OF THE INVENTION

1. Field of the Invention

The present invention relates to a tensioning apparatus including a rotating shaft and a strap inserted through the rotating shaft such that the strap has first and second portions extending in opposite directions, and by operably moving the rotating shaft the first portion of the strap is wound onto the shaft. The tensioning apparatus further includes a reeling device onto which the second portion of the strap is adapted to be wound.

2. Description of the Related Art

FIG. 13 shows a conventional tensioning apparatus including a reeling device. The reeling device is rotatably mounted between two pivotal arms 93 of the tensioning apparatus. The reeling device includes a shaft 91 interconnecting the two pivotal arms 93, a slot 94 extending through the shaft 91, and two cylindrical knobs 92 connected to proximal and distal ends of the shaft 91 respectively. Additionally, user grips the shaft 91 to operably move the two pivotal arms 93. Further, a strap is adapted to be inserted through the slot 94 and wound onto the shaft 91 thereafter by rotating the knobs 92. However, this design suffers from a problem that the strap which is wounded around the shaft 91 would obstruct user to grip the shaft 91.

The present invention is, therefore, intended to obviate or at least alleviate the problems encountered in the prior art.

SUMMARY OF THE INVENTION

According to the present invention, a tensioning apparatus includes a frame and a shaft rotatably installed on the frame. The shaft includes two ratchet wheels connected to proximal and distal ends thereof. Additionally, the two ratchet wheels are rotatable with the shaft concurrently. Further, a handle is pivotally connected to the frame such that the shaft and ratchet wheels are rotated upon operation of the handle. Additionally, the handle includes two cams parallel to each other. A gripping portion is installed between and interconnects first ends of the two cams. Also, the shaft is installed between and interconnects the second ends of the two cams. Further, a detent is movably installed on the handle between an operative position in engagement with the ratchets in order to rotate the shaft and an idle position away from the ratchets. The tensioning apparatus further includes a reeling device, and the reeling device is rotatably installed on the handle and is disposed between the gripping portion and the detent.

The tensioning apparatus is adapted to tension a strap which is inserted through the shaft and which includes first and second portions extending in opposite directions. Upon pivoting the handle, the first portion is adapted to be wound onto the shaft. Moreover, the reeling device is adapted to receive the second portion of the strap and by rotating the reeling device the second portion of the strap is wound onto the reeling device.

It is therefore an objective of the present invention that the strap which is wounded around the reeling device wouldn't obstruct user to grip the gripping portion of the handle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

BRIEF DESCRIPTION OF THE DRAWINGS

For the present disclosure to be easily understood and readily practiced, the present disclosure will now be described in conjunction with the following figures, wherein.

DETAILED DESCRIPTION OF THE PREFERRED EMBODIMENT

Figure 1:
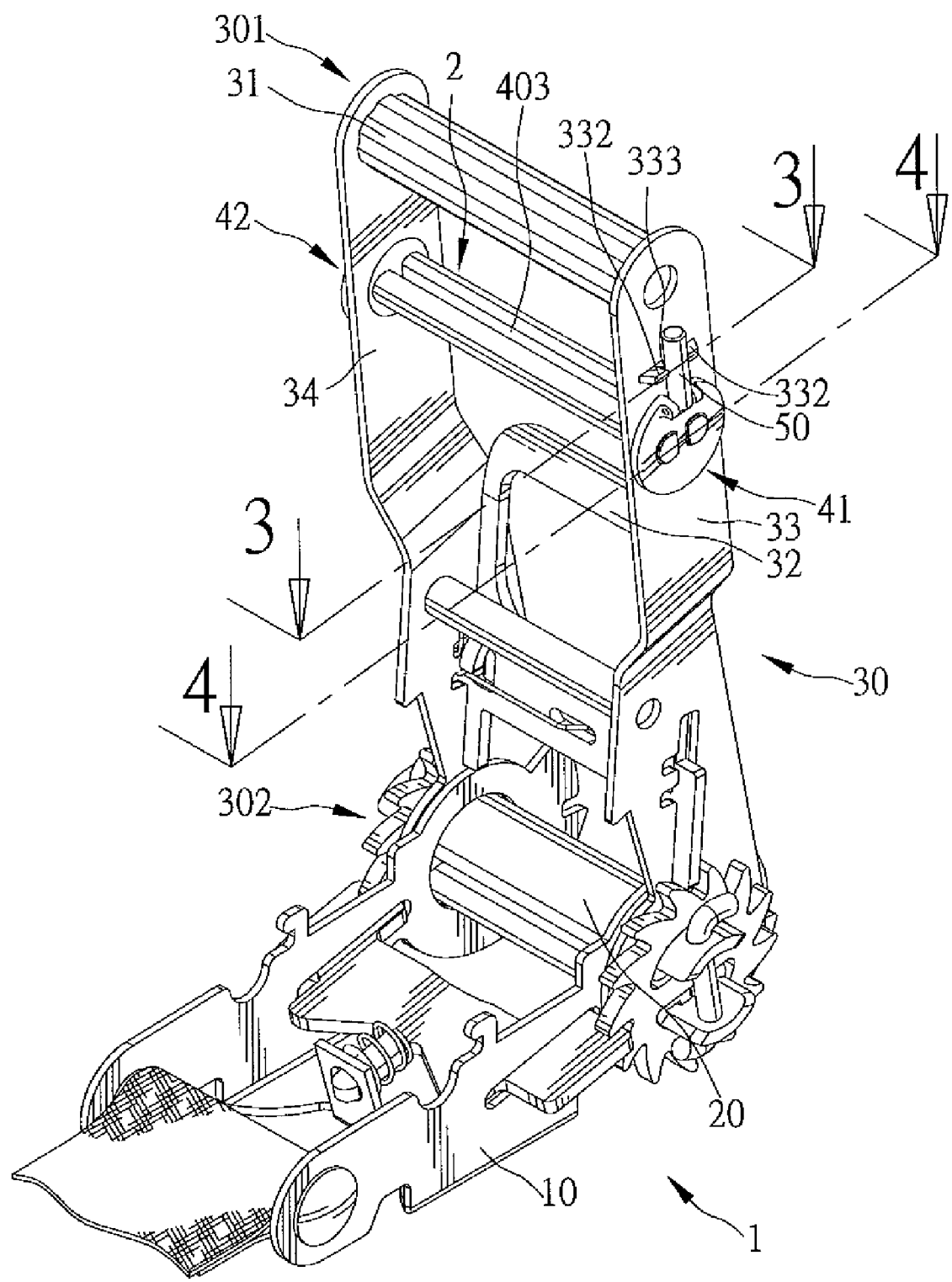
FIG. 1 is a perspective view of a tensioning apparatus in accordance with a first embodiment of the present invention.
Figure 2:
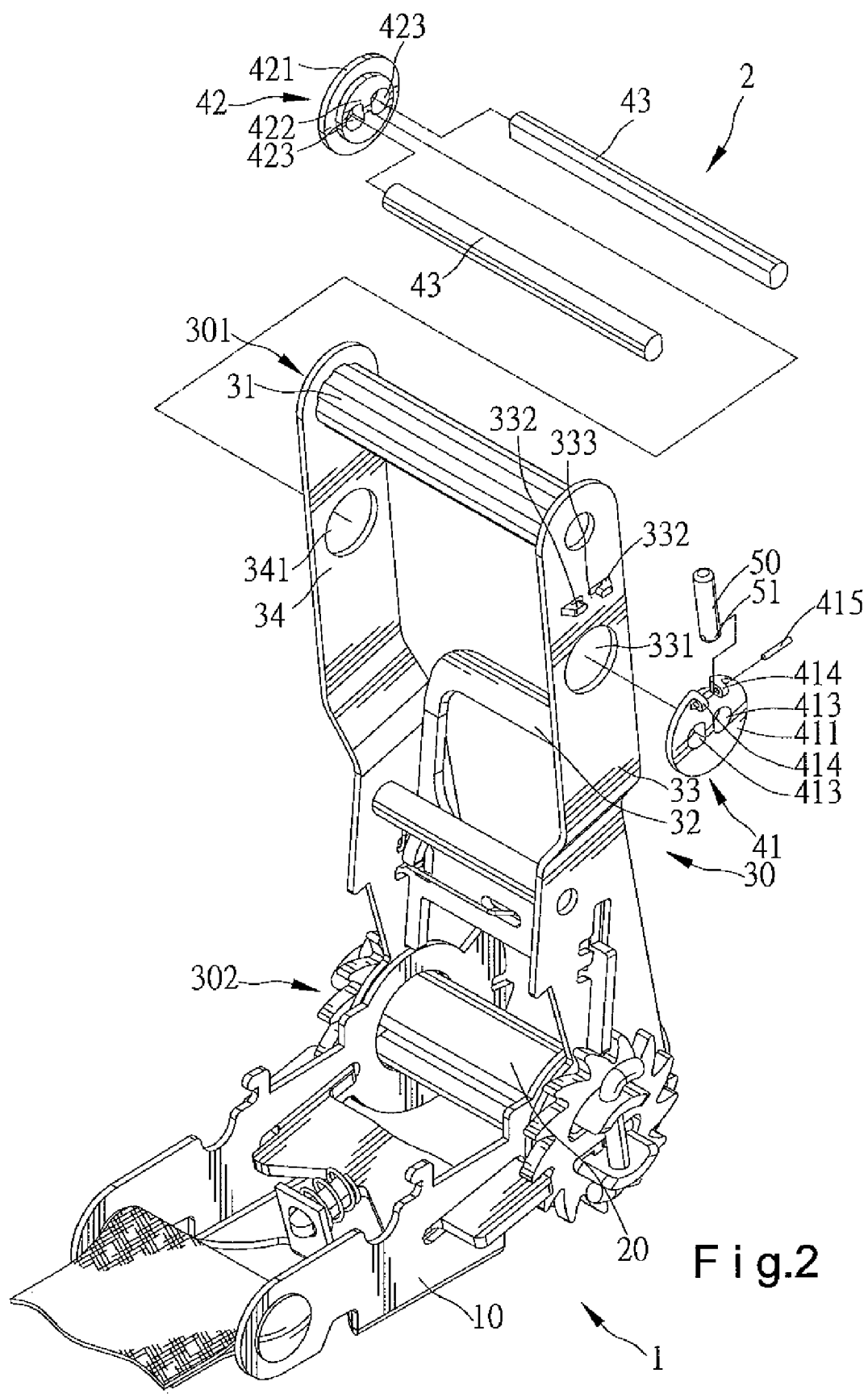
FIG. 2 is an exploded perspective view of a reeling device shown in FIG. 1.

FIGS. 1 through 10 show a tensioning apparatus 1 in accordance with a first embodiment of the present invention. As best shown in FIG. 2, the tensioning apparatus 1 includes a frame 10 and a shaft 20 rotatably installed on the frame 10. The shaft 20 includes two ratchet wheels (not numbered) connected to proximal and distal ends thereof. Additionally, the two ratchet wheels are rotatable with the shaft 20 concurrently. Further, a handle 30 is pivotally connected to the frame 10 and the handle 30 is adapted to rotate the shaft 20 and ratchet wheels.

The handle 30 includes two cams 33 and 34 parallel to each other. A gripping portion 31 is installed between and interconnects first ends of the two cams 33 and 34. Also, the shaft 20 is installed between and interconnects the second ends of the two cams 33 and 34. Further, a detent 32 is movably installed on the handle 30 between an operative position in engagement with the ratchets in order to rotate the shaft and an idle position away from the ratchets.

Figure 5:
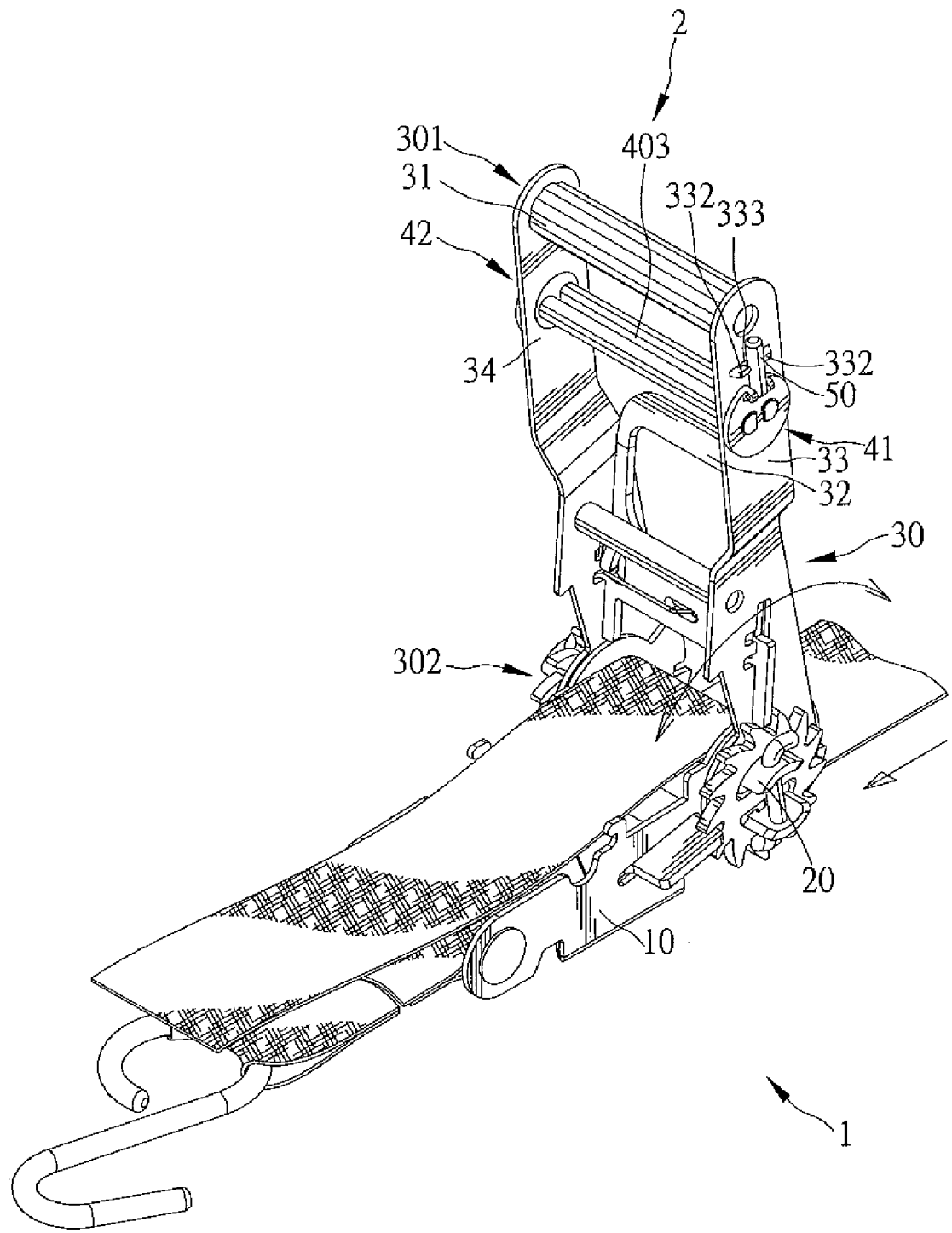
FIG. 5 is a perspective view showing a handle of the tensioning apparatus is reciprocally pivoted to rewind a strap.
Figure 6:
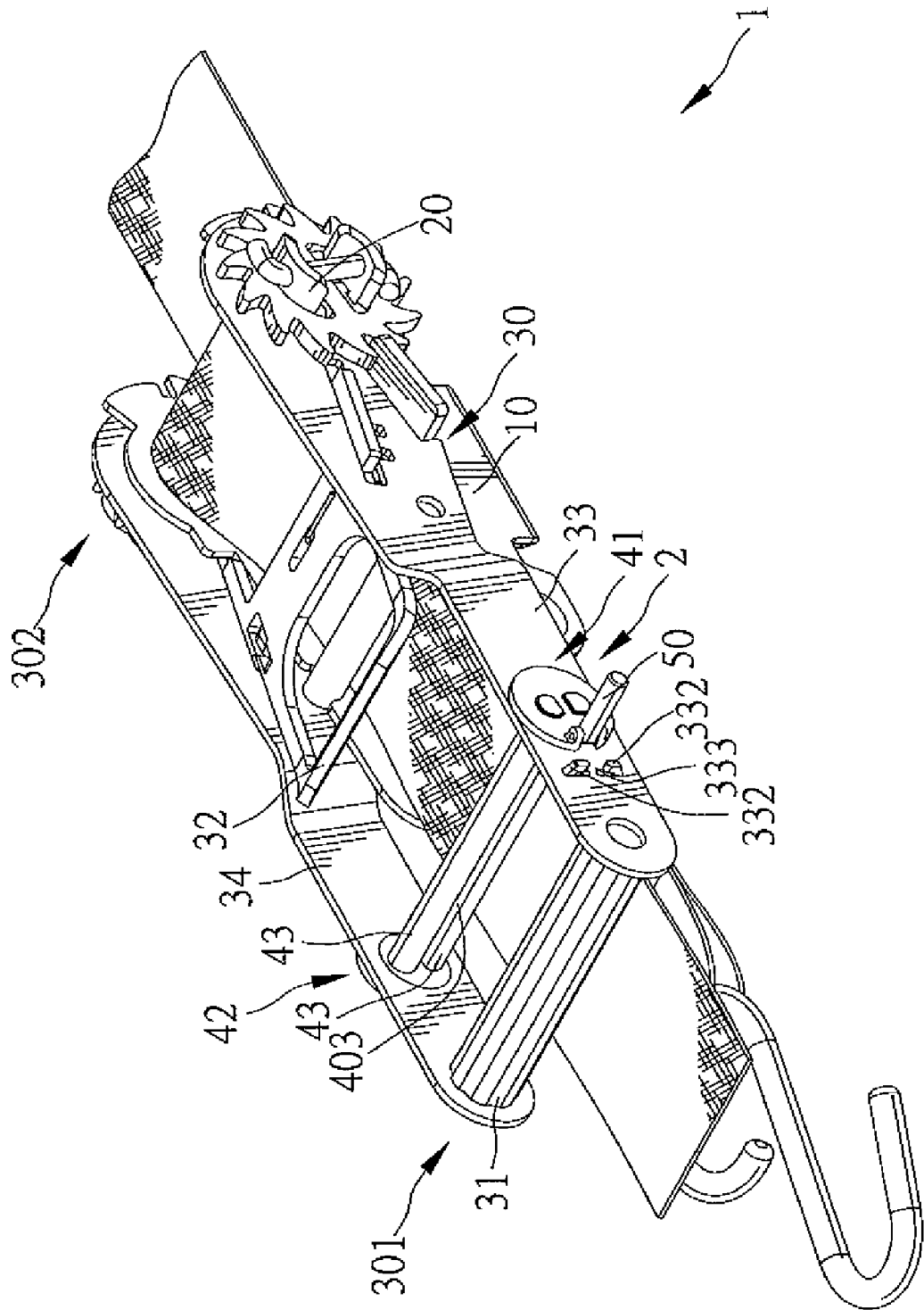
FIG. 6 is an extended view of FIG. 5, showing the handle finishes winding the strap.

The tensioning apparatus 1 is adapted to tension a strap. As shown in FIG. 5, the strap is inserted through the shaft 20 and includes first and second portions extending in opposite directions and the first portion of the strap is wound onto the shaft 20 by reciprocally pivoting the handle 30. Additionally, FIG. 6 shows that the handle 30 is in a stowed position after finishing winding the strap.

The tensioning apparatus 1 further includes a reeling device 2, and the reeling device 2 is rotatably installed on the handle 30 and is disposed between the gripping portion 31 and the detent 32. As best shown in FIG. 2, the reeling device 2 includes two connecting plates 41 and 42. The two connecting plates 41 and 42 are rotatably installed on the two cams 33 and 34, respectively. In this embodiment, the two cams 33 and 34 include two through holes 331 and 341 respectively, and the two through holes 331 and 341 are coaxial with each other, and the connecting plate 41 is rotatably installed in the through hole 331 while the connecting plate 42 is rotatably installed in the through hole 341. Additionally, the connecting plate 41 is configured with first and second connecting sections 411 and 412. The first connecting section 411 has a cross-section larger than that of the second connecting section 412. Further, the second connecting section 412 and the through hole 331 are in tight engagement, and the first connecting section 411 prevents disengagement of the connecting plate 41 from the hole 331. Likewise, the connecting plate 42 is configured with first and second connecting sections 421 and 422. The first connecting section 421 has a cross-section larger than that of the second connecting section 422. Further, the second connecting section 422 and the through hole 341 are in tight engagement, and the first connecting section 421 prevents disengagement of the connecting plate 42 from the hole 341.

Figure 3:
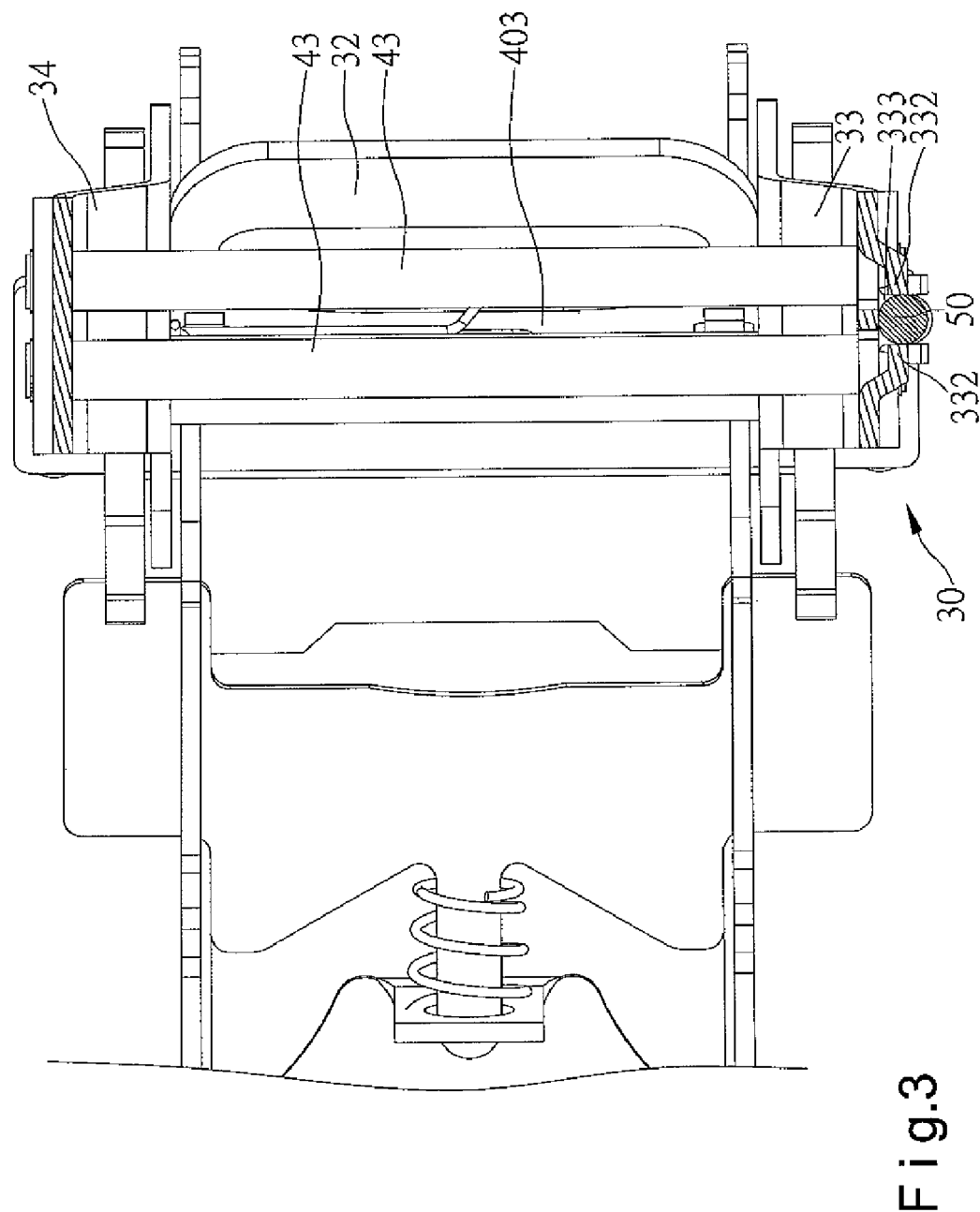
FIG. 3 is a cross-sectional view taken along line 3-3 of FIG. 1.
Figure 4:
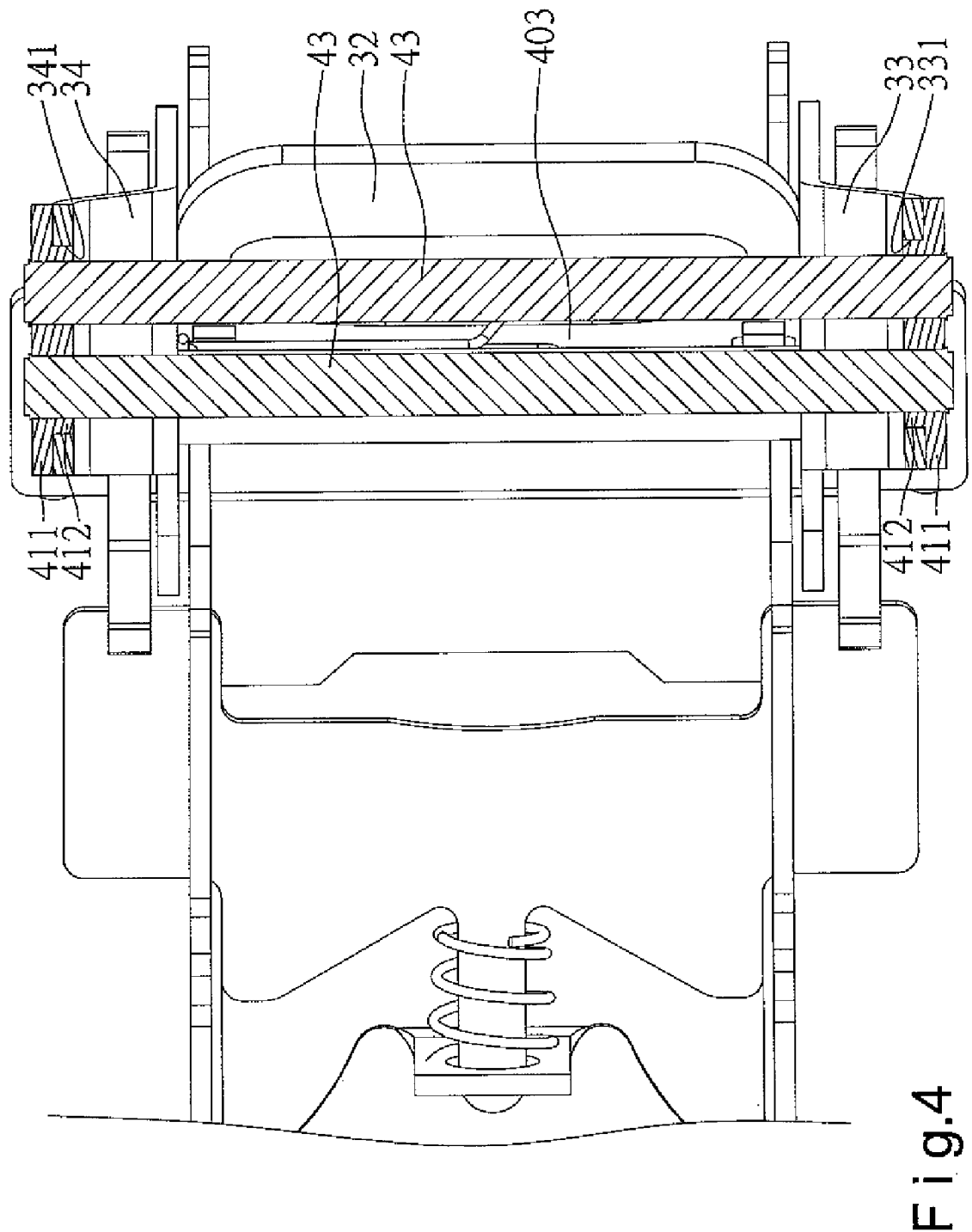
FIG. 4 is a cross-sectional view taken along line 4-4 of FIG. 1.

Also, the connecting plate 41 includes two apertures 413 extending therethrough and the connecting plate 42 includes two apertures 423 extending therethrough. One bar 43 includes a proximal end inserted through one of the apertures 413 and securely connected to the connecting plate 41 by pressing process and a distal end inserted through one of the apertures 423 and securely connected to the connecting plate 42 by pressing process. Another bar 43 includes a proximal end inserted through the other of the apertures 413 and securely connected to the connecting plate 41 by pressing process and a distal end inserted through the other of the apertures 423 and securely connected to the connecting plate 42 by pressing process. Additionally, the two bars 43 define a slot 403 therebetween, as best shown in FIGS. 3 and 4. Moreover, the apertures 413 and 423 and the bars 43 have cross sections that are preferably non-circular in order to prevent relative rotation of the bar 43 in the apertures 413 and 423.

The reeling device 2 further includes a control stick 50. The control stick 50 includes a pivotal end 51 pivotally connected to the connecting plate 41. In this embodiment, the connecting plate 41 includes two lugs 414 protruded therefrom and the pivotal end 51 of the control stick 50 is engaged between the two lugs 414 by a rod 415.

Figure 8:
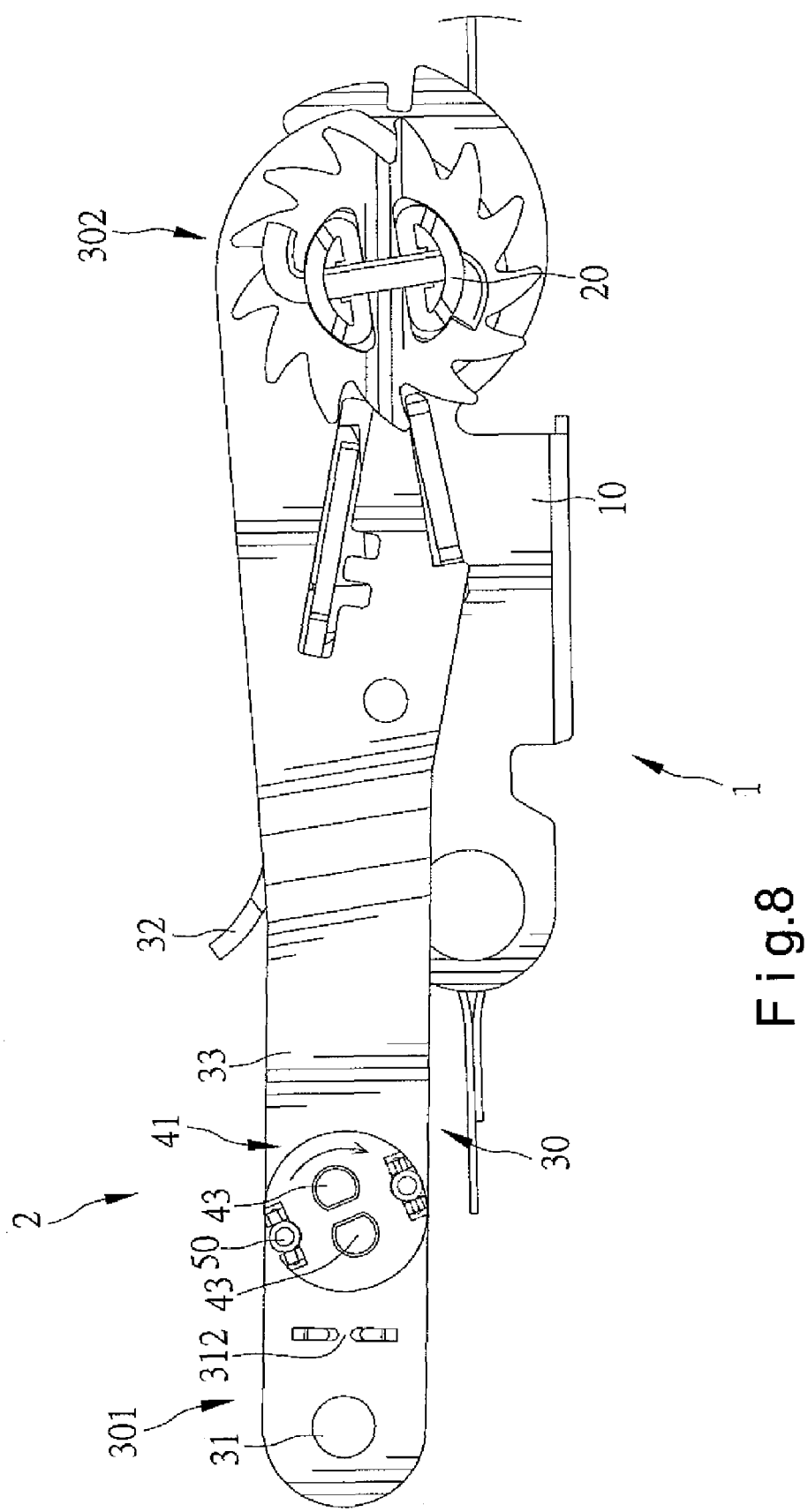
FIG. 8 is a side view showing the operation of the reeling device.
Figure 10:
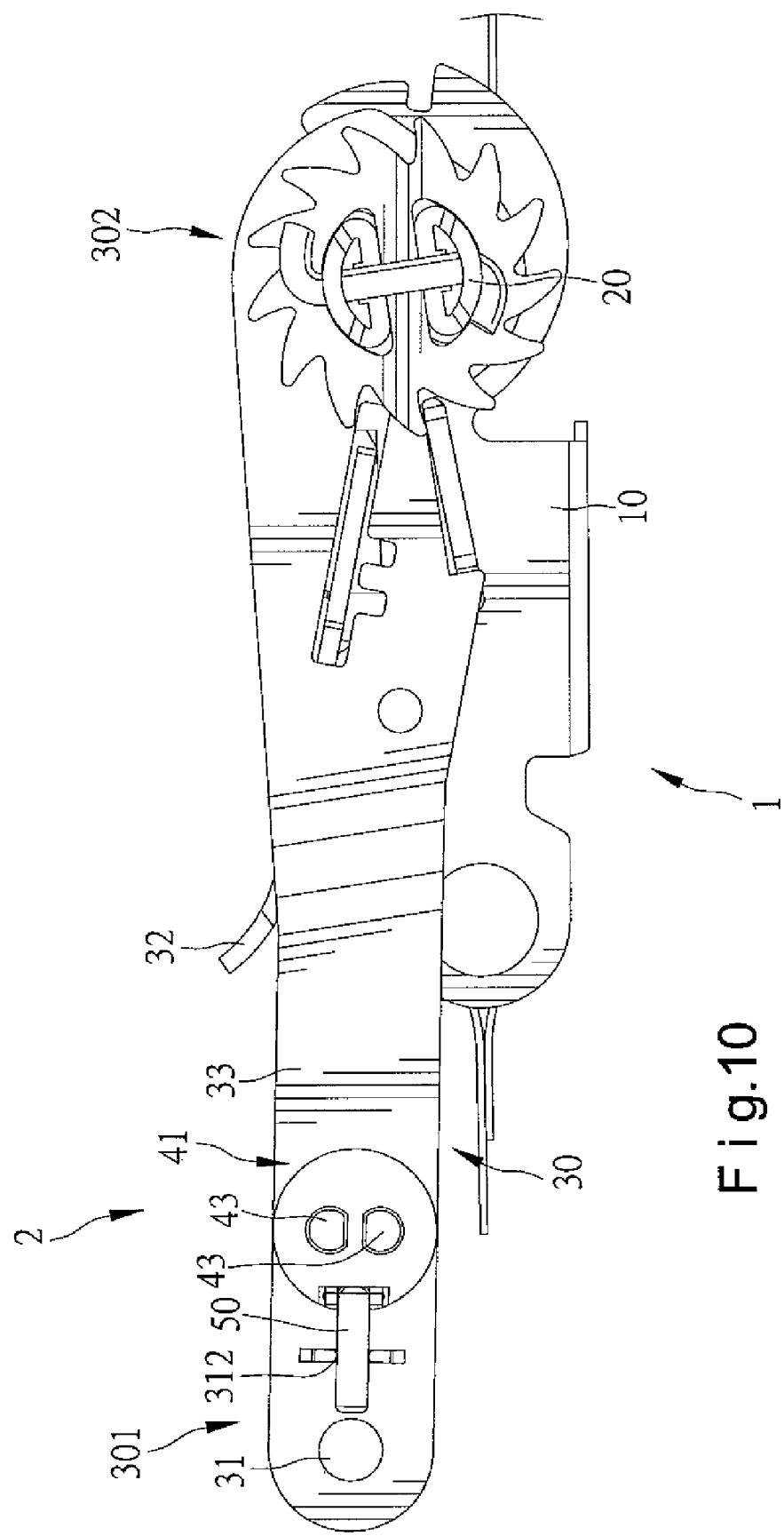
FIG. 10 is an extended view of FIG. 8, showing the reeling device is in a stowed position.

Referring to FIG. 2 in conjunction with FIGS. 8 and 10, the control stick 50 is moveable between a first position in engagement with a retaining portion 333 in order to retain reeling device 2 from rotation with respect to the handle 30 and a second position away from the retaining portion 333. Additionally, one of the two cams 33 and 34 includes two hooks 332 extruded from the respective cam 33, 34 and the retaining portion 333 is defined between the two hooks 332, and the control stick 50 is removably engagable between the two hooks 332.

Figure 7:
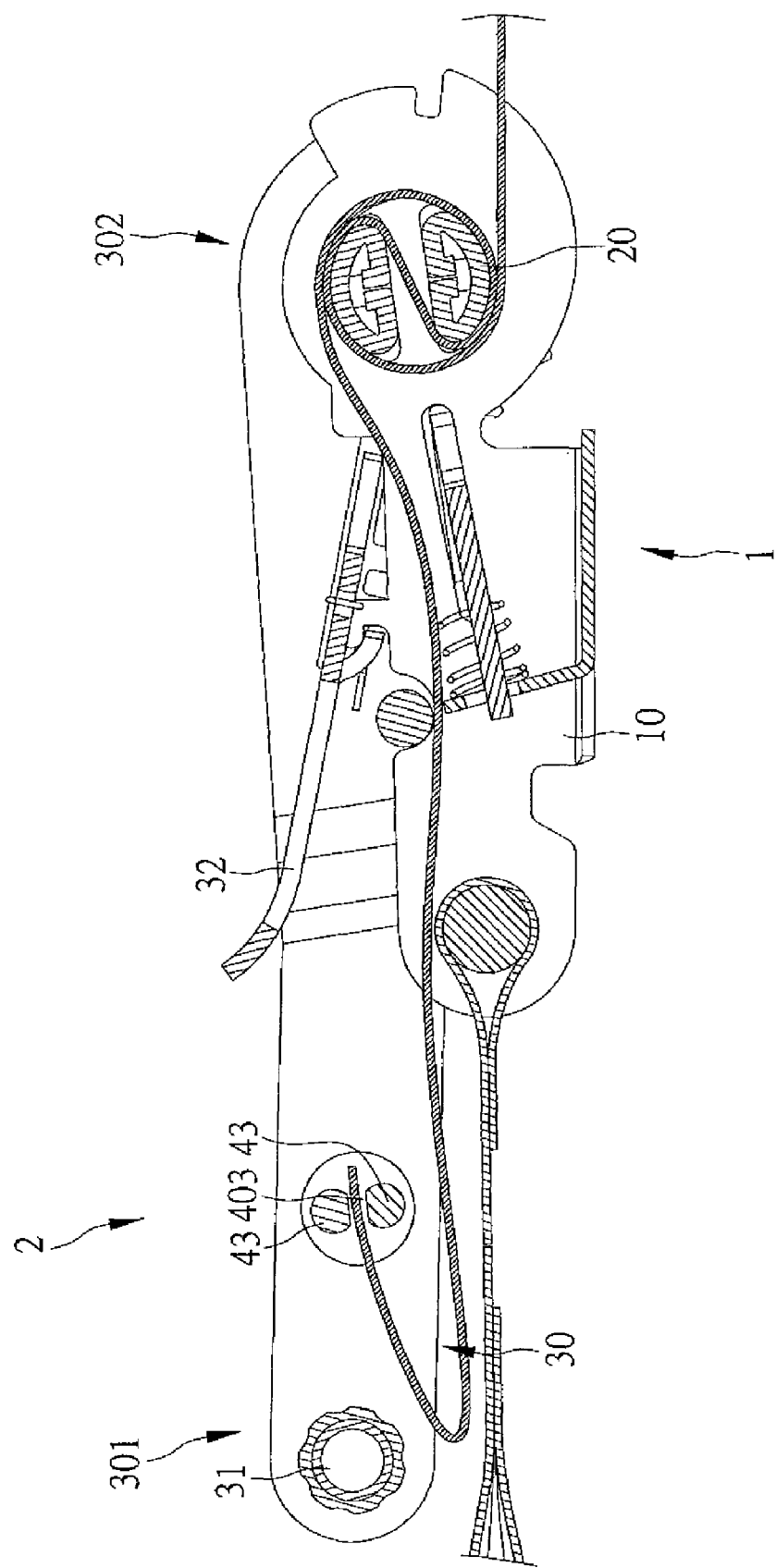
FIG. 7 is a cross-sectional view showing an end of the strap is inserted through the reeling device.
Figure 9:
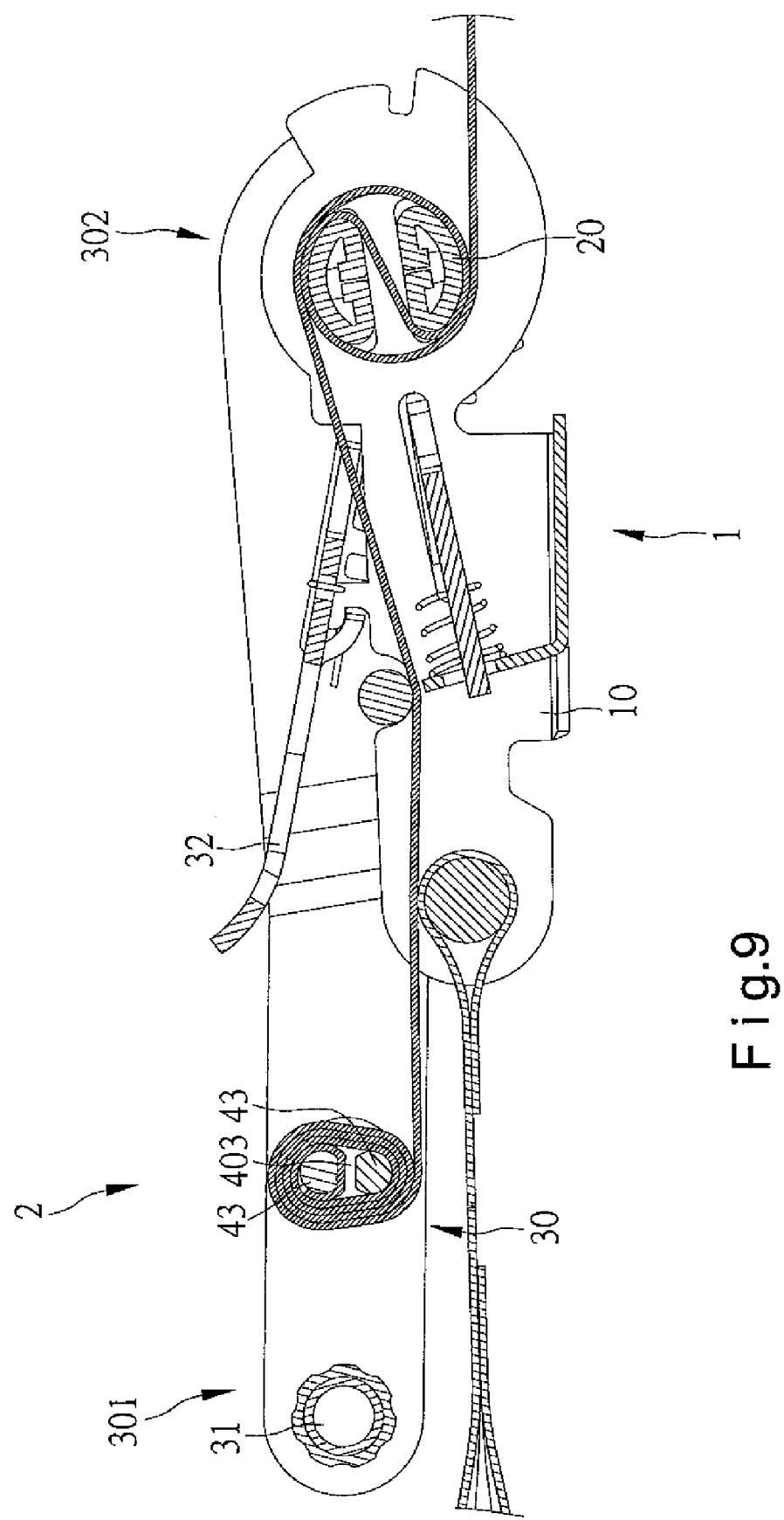
FIG. 9 is an extended view of FIG. 7, showing the strap is rewound onto the reeling device.

FIGS. 7 and 9 show that the second portion of the strap is adapted to be inserted through the slot 403 and is wound onto the two bars 43 upon operation of the control stick 50. Additionally, after the control stick 50 finishes winding the strap, the control stick is pivoted in a stowed position in engagement between the two hooks 332.

Figure 11:
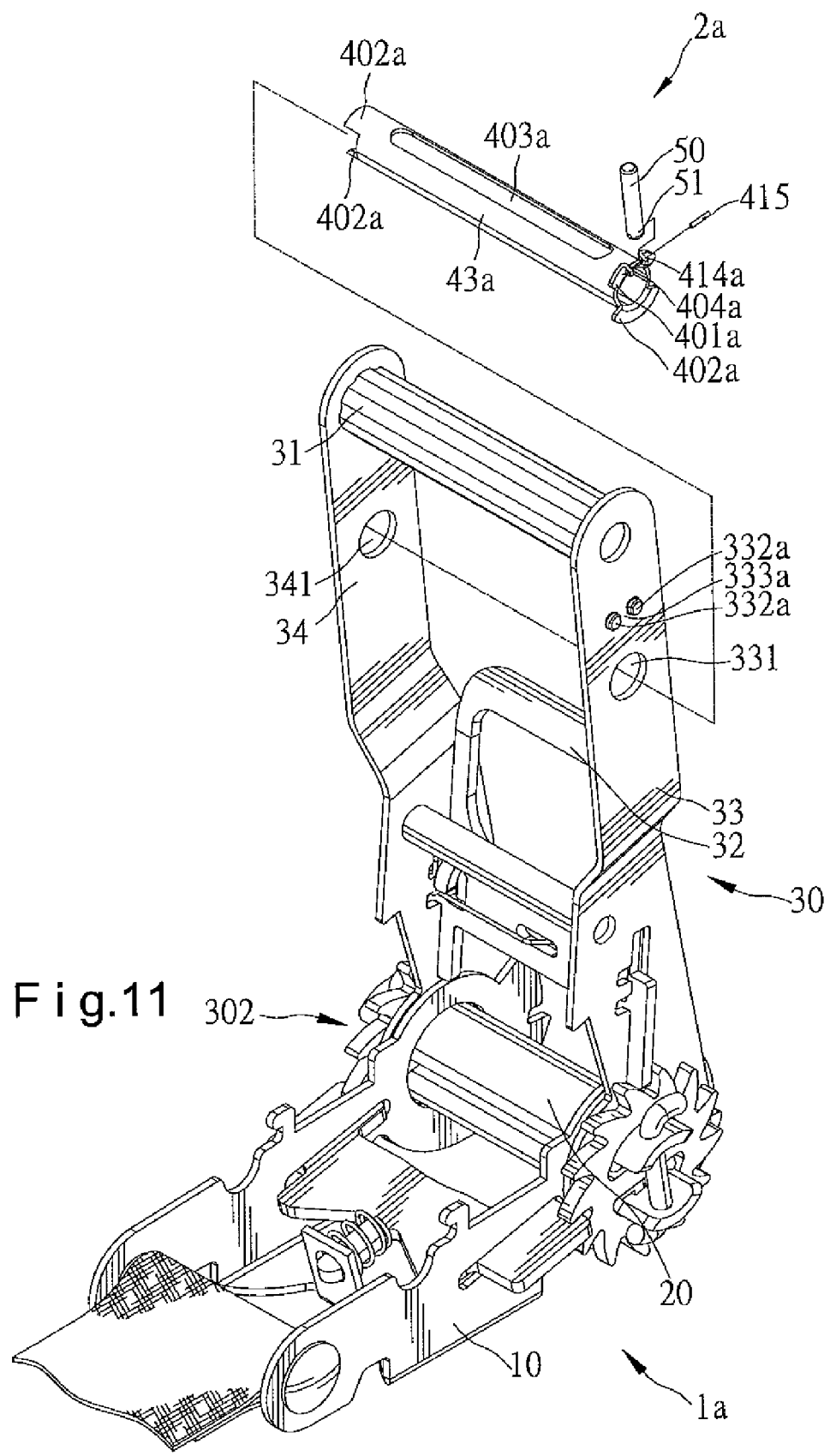
FIG. 11 is a perspective view of a tensioning apparatus in accordance with a second embodiment of the present invention.
Figure 12:
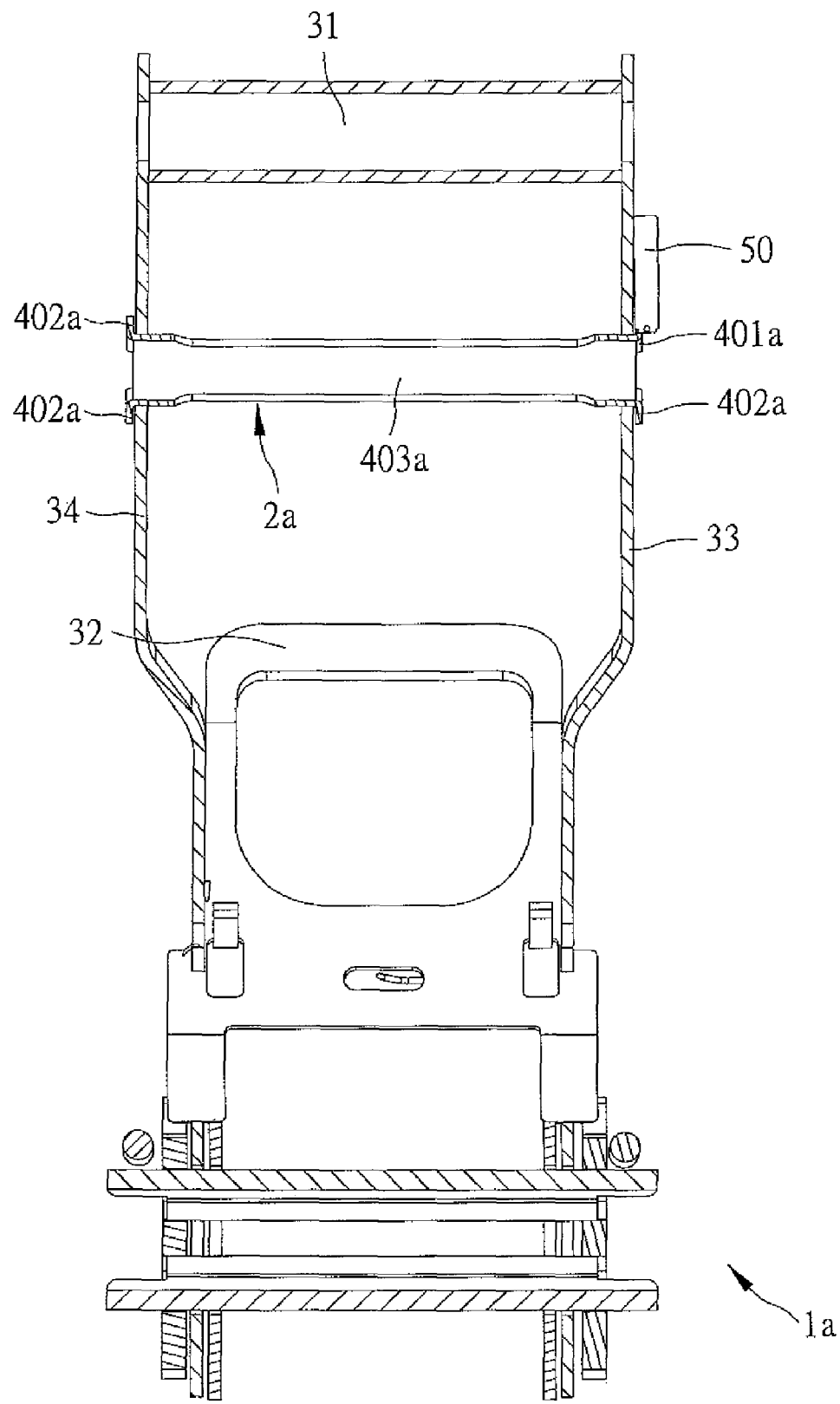
FIG. 12 is a cross-sectional view of the tensioning apparatus shown in FIG. 11.
Figure 13:
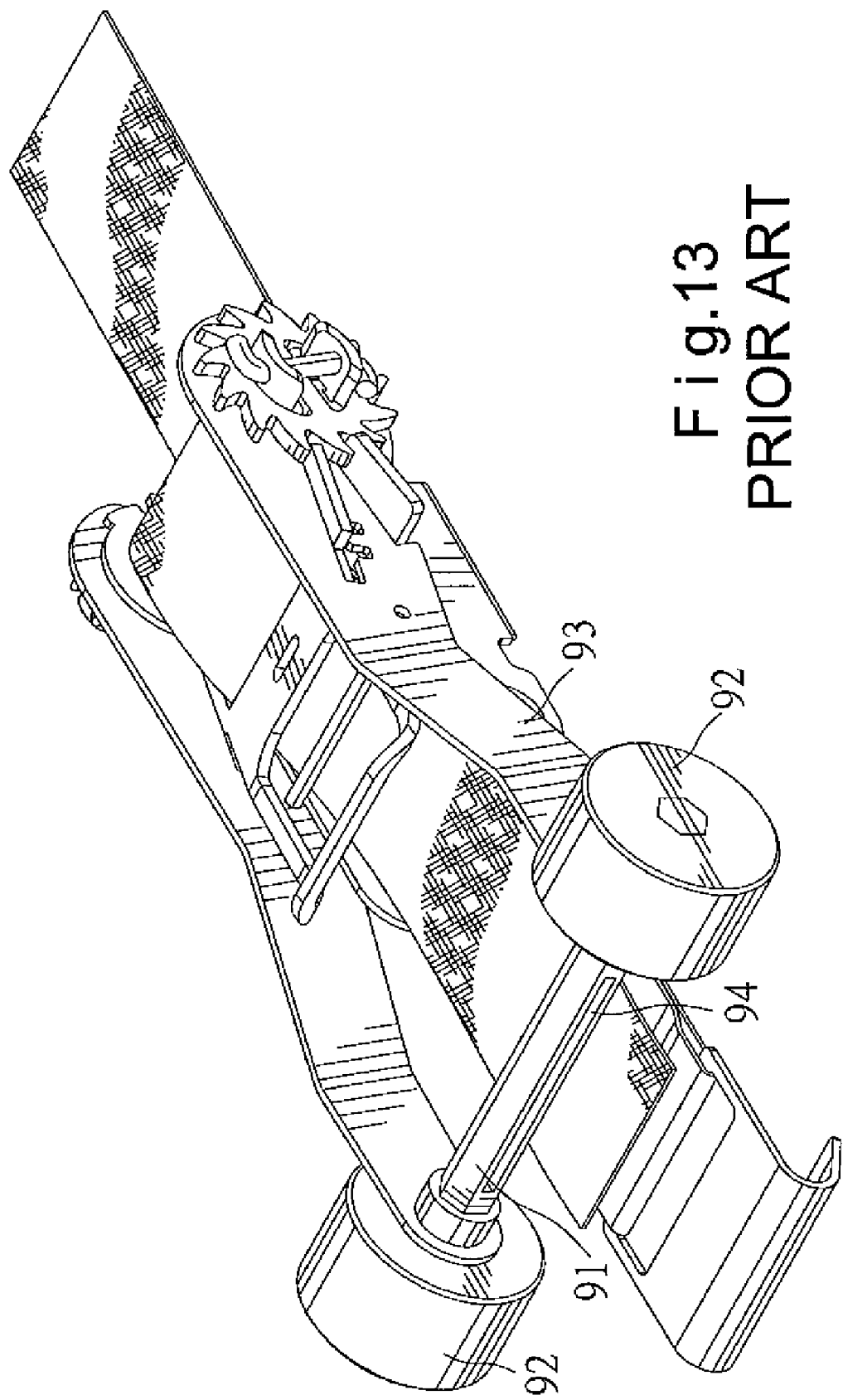
FIG. 13 is a perspective view of a conventional tensioning apparatus.

FIGS. 11 and 12 show a tensioning apparatus 1a in accordance with a second embodiment of the present invention. The second embodiment is similar to the first embodiment except that each of the two cams 33 and 34 includes two hooks 332a formed on the surface of the respective cam 33, 34, and a retaining portion 333a is defined between the two hooks 332a. Further, the tensioning apparatus 1a includes a reeling device 2a. The reeling device 2a includes a bar 43a. Preferably, the bar 43a is hollow. Likewise, the bar 43a includes a proximal end rotatably installed in to one of the two through holes 331 and 341 and a distal end rotatably installed in the other of the two through holes 331 and 341. Further, a slot 403a extends transversely through the bar 43a.

As shown in FIG. 11, the bar 43a includes a first flange 401a and three second flanges 402a, with the first flange 401a and one of the second flanges 402a extended from the proximal end thereof, and with the other two second flanges 402a extended from the distal end thereof FIG. 12 shows that the first and the second flange 402a in the proximal end of the bar 43a are bent in opposite direction in engagement with the cam 33, and the rest two second flanges 402a in the distal end of the bar 43a are bent in opposite direction in engagement with the cam 34. Moreover, the first flange 401a includes two lugs 414a spaced form each other and the pivotal end 51 of control stick 50 is engaged between the two lugs 414a.

While the specific embodiments have been illustrated and described, numerous modifications come to mind without significantly departing from the spirit of invention and the scope of invention is only limited by the scope of accompanying claims.

What is claimed is:

1. A tensioning apparatus comprising:
 a frame;
 a shaft rotatably installed on the frame;
 two ratchet wheels connected to proximal and distal ends of the shaft respectively and rotatable with the shaft concurrently;
 a handle including two cams each having a first end and a second end opposite to the first end, with the second ends of the two cams connected to the proximal and distal ends of the shaft respectively, the handle further including a gripping portion connected between the first ends of the two cams;
 a detent movably installed on the handle between an operative position in engagement with the ratchet wheels in order to rotate the shaft and an idle position away from the ratchet wheels;
 a reeling device rotatably installed on the handle and disposed between the gripping portion and the detent; and
 a strap inserted through the shaft and including first and second portions extending in opposite directions, with the first portion adapted to be wound onto the shaft and the second portion adapted to be wound onto the reeling device.

2. The tensioning apparatus as claimed in claim 1 wherein one of the two cams includes a retaining portion, and wherein the reeling device includes a control stick moveable between a first position in engagement with the retaining portion in order to retain the reeling device from rotation with respect to the handle and a second position away from the retaining portion.

3. The tensioning apparatus as claimed in claim 2 wherein the two cams include two through holes respectively, and the two through holes are coaxial with each other, and wherein the reeling device is rotatably moveable in the two through holes.

4. The tensioning apparatus as claimed in claim 3 wherein one of the two cams includes two hooks, and wherein the retaining portion is defined between the two hooks, and wherein the control stick is removably engagable between the two hooks in order to retain the reeling device from rotation with respect to the handle.

5. The tensioning apparatus as claimed in claim 3 wherein the reeling device includes two connecting plates rotatably installed in the two through holes respectively, and two bars each having a proximal end connected to one of the two connecting plates and a distal end connected to the other of the two connecting plates, and wherein the two bars define a slot therebetween for insertion of the strap.

6. The tensioning apparatus as claimed in claim 5 wherein the control stick includes a pivotal end pivotally connected to one of the two connecting plates.

7. The tensioning apparatus as claimed in claim 3 wherein the reeling device includes a bar having a proximal end rotatably installed into one of the two through holes and a distal end rotatably installed in the other of the two through holes, and a slot extending transversely through the bar for insertion of the strap.

8. The tensioning apparatus as claimed in claim 7 wherein the bar is hollow.

9. The tensioning apparatus as claimed in claim 7 wherein the bar includes a first flange and three second flanges, with the first flange and one of the second flanges extended from the proximal end thereof and being bent in opposite directions in engagement with one of the two cams, and with the other two second flanges extended from the distal end thereof and being bent in opposite directions in engagement with the other of the two cams.

10. The tensioning apparatus as claimed in claim 9 wherein the first flange includes a lug, and wherein the control stick includes a pivotal end pivotally connected to the lug.

\* \* \* \* \*